(12) United States Patent
Farrell et al.

(10) Patent No.: US 9,487,890 B1
(45) Date of Patent: Nov. 8, 2016

(54) VALVE FOR CONTROLLING FABRIC PERMEABILITY, CONTROLLABLE PERMEABILITY FABRIC, AND ARTICLES USING SAME

(71) Applicant: Wizbe Innovations LLC, Manchester, ME (US)

(72) Inventors: Stan Edward Farrell, Manchester, ME (US); Robert S Farrell, Northport, ME (US)

( * ) Notice: Subject to any disclaimer, the term of this patent is extended or adjusted under 35 U.S.C. 154(b) by 612 days.

(21) Appl. No.: 13/865,992

(22) Filed: Apr. 18, 2013

Related U.S. Application Data

(60) Provisional application No. 61/647,205, filed on May 15, 2012.

(51) Int. Cl.
| | |
|---|---|
| *B01D 39/08* | (2006.01) |
| *B01D 39/16* | (2006.01) |
| *B64D 17/18* | (2006.01) |
| *B63H 9/06* | (2006.01) |
| *D03D 25/00* | (2006.01) |
| *F16K 31/00* | (2006.01) |
| *F16K 31/02* | (2006.01) |

(52) U.S. Cl.
CPC ............... *D03D 25/00* (2013.01); *B01D 39/08* (2013.01); *B63H 9/0657* (2013.01); *B64D 17/18* (2013.01); *F16K 31/002* (2013.01); *B01D 2201/167* (2013.01)

(58) Field of Classification Search
CPC .. B01D 39/08; B01D 39/083; B01D 39/086; B01D 39/16; B01D 39/1607; B01D 39/1615; B01D 36/1623; B01D 2201/16; B01D 2201/167; B64D 17/00; B64D 17/02; B64D 17/18; B64D 17/20; B64D 17/62; B63H 9/06; B63H 9/0657; D03D 25/00; F16K 31/00; F16K 31/002; F16K 31/02; F16K 31/003
USPC ................ 55/361, 367, 527, 528; 137/223; 114/102.1, 102.22, 102.23, 102.29, 114/102.31; 210/418, 503, 505; 244/142–145, 149; 251/129.01; 280/728.1, 736, 739, 742
See application file for complete search history.

(56) References Cited

U.S. PATENT DOCUMENTS

| | | | | |
|---|---|---|---|---|
| 2,358,582 | A * | 9/1944 | Little | B64D 17/00 244/145 |
| 2,374,627 | A * | 4/1945 | Strong | B64D 21/00 244/142 |
| 2,789,406 | A * | 4/1957 | Mosier | C07C 309/29 100/40 |
| 3,045,402 | A * | 7/1962 | Keely | B65B 51/067 493/117 |
| 3,222,016 | A | 12/1965 | Boone | |
| 4,540,625 | A | 9/1985 | Sherwood | |
| 4,716,712 | A * | 1/1988 | Gill | B65B 1/26 53/523 |
| 5,115,582 | A | 5/1992 | Westhead | |

(Continued)

FOREIGN PATENT DOCUMENTS

GB 576885 * 4/1946

*Primary Examiner* — Joseph Drodge
(74) *Attorney, Agent, or Firm* — Shalom Wertsberger; Saltamar Innovations

(57) ABSTRACT

Shape memory actuators are utilized to controllably modify the permeability of fabric and fabric based articles. The SMA actuator operates by changing the geometric permeability or by modifying the weave permeability of the fabric based article, or one or more portions thereof. The invention further provides for applications of the controllable permeability fabric, which include by way of example, various parachute, sail, and filter embodiments.

21 Claims, 12 Drawing Sheets

(56) References Cited

U.S. PATENT DOCUMENTS

| | | |
|---|---|---|
| 6,164,339 A | 12/2000 | Greenhalgh |
| 6,192,944 B1 | 2/2001 | Greenhalgh |
| 7,367,985 B2 | 5/2008 | Mazzocchi et al. |
| 7,416,665 B2 * | 8/2008 | Kang .................. B01D 29/216 |
| | | 210/237 |
| 7,820,571 B2 | 10/2010 | Kuroda et al. |
| 7,886,752 B2 * | 2/2011 | Jerg .................... A47L 15/4208 |
| | | 134/110 |
| 2004/0183283 A1 | 9/2004 | Buckman et al. |
| 2004/0217319 A1 * | 11/2004 | Reeves ................ F16K 3/0227 |
| | | 251/328 |
| 2005/0020160 A1 | 1/2005 | Rock et al. |
| 2007/0135834 A1 | 6/2007 | Clubb et al. |
| 2008/0223500 A1 | 9/2008 | Colasanto et al. |
| 2008/0228028 A1 | 9/2008 | Carlson et al. |
| 2008/0254263 A1 | 10/2008 | Yasui et al. |
| 2009/0099647 A1 | 4/2009 | Glimsdale et al. |
| 2009/0112251 A1 | 4/2009 | Qian et al. |
| 2009/0197491 A1 | 8/2009 | Rock et al. |

* cited by examiner

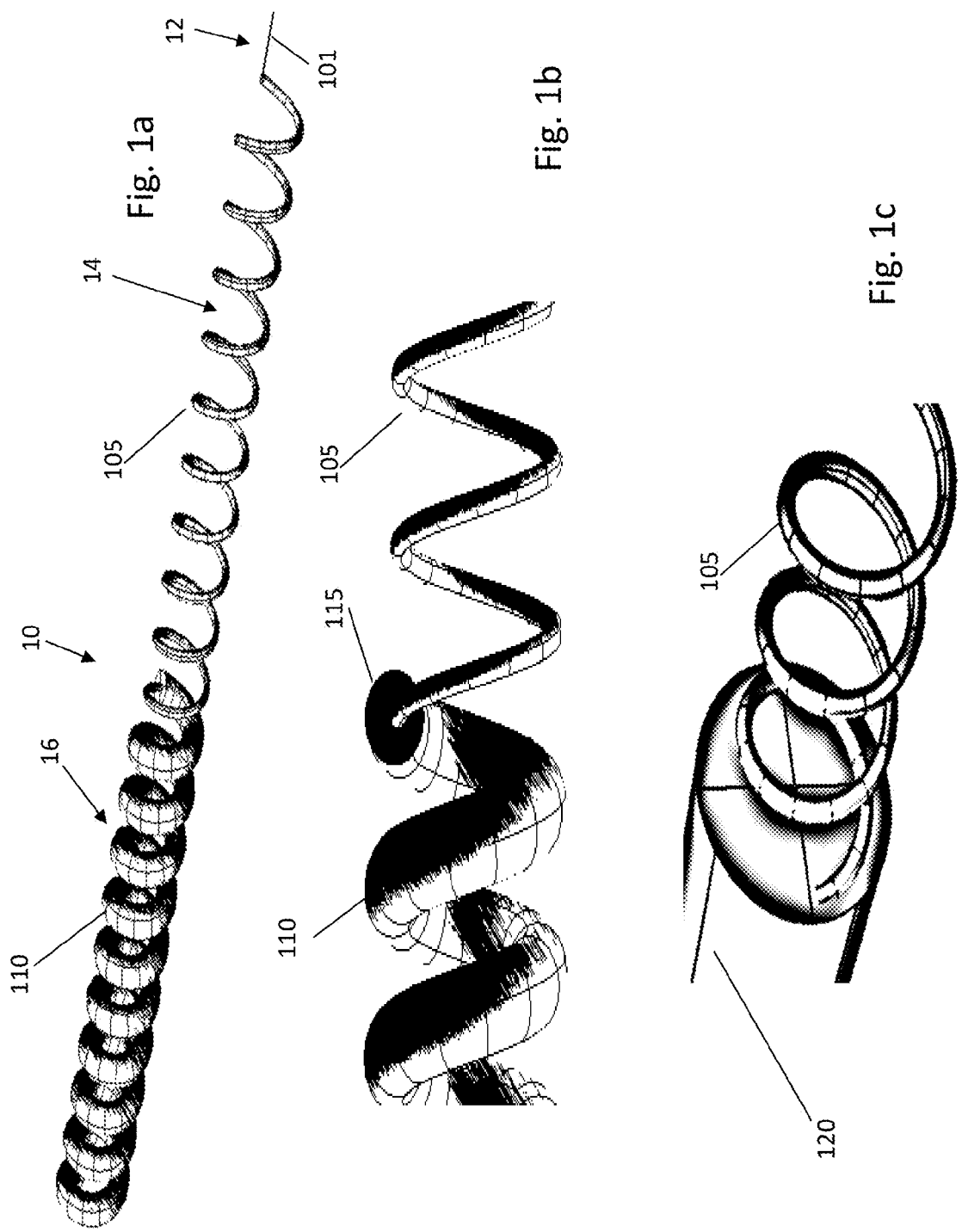

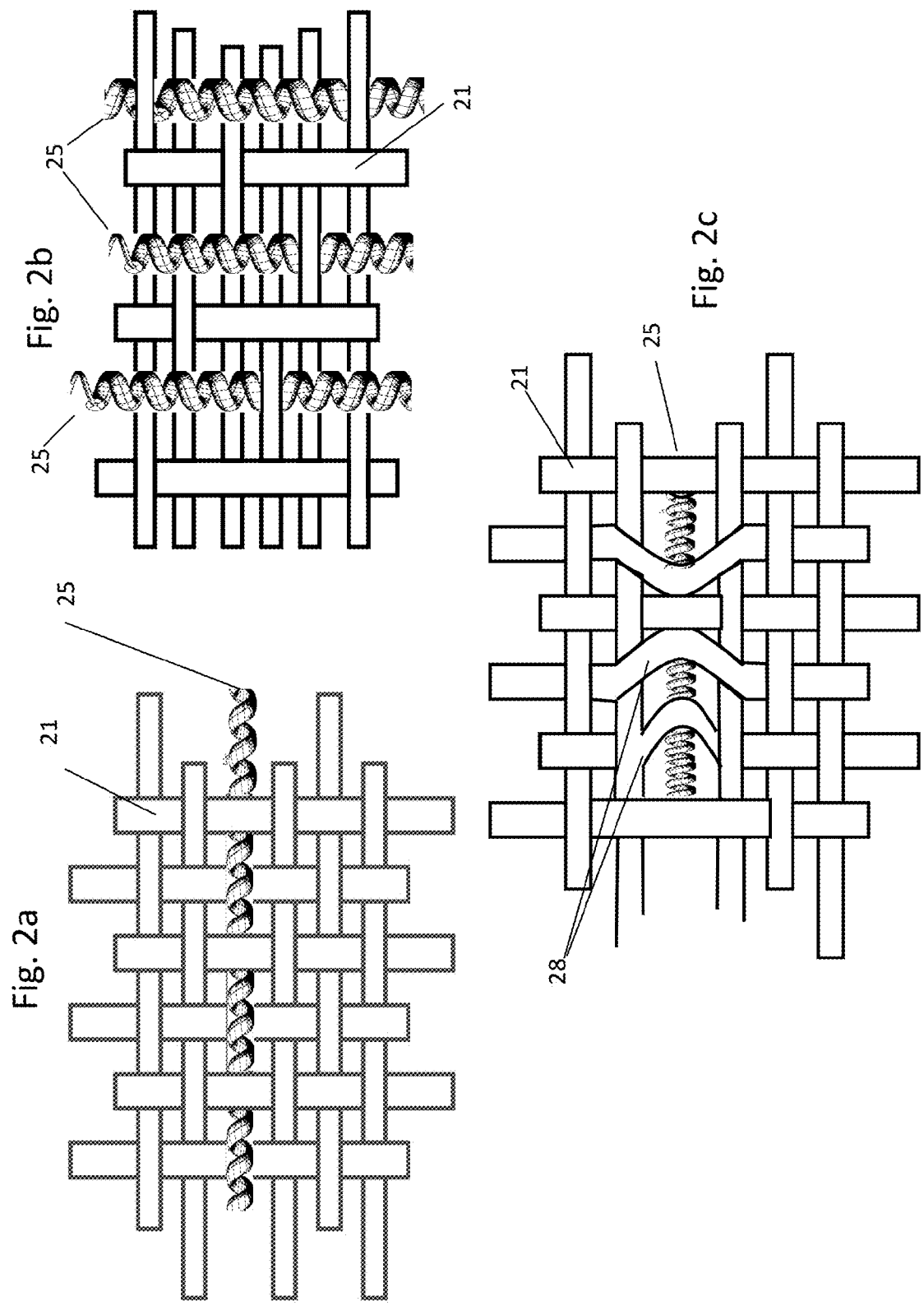

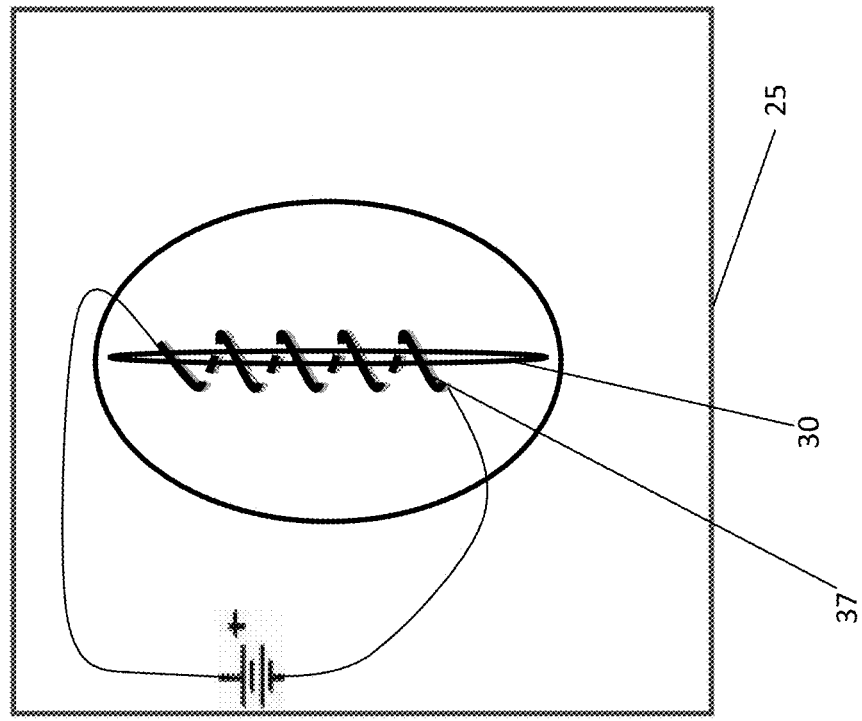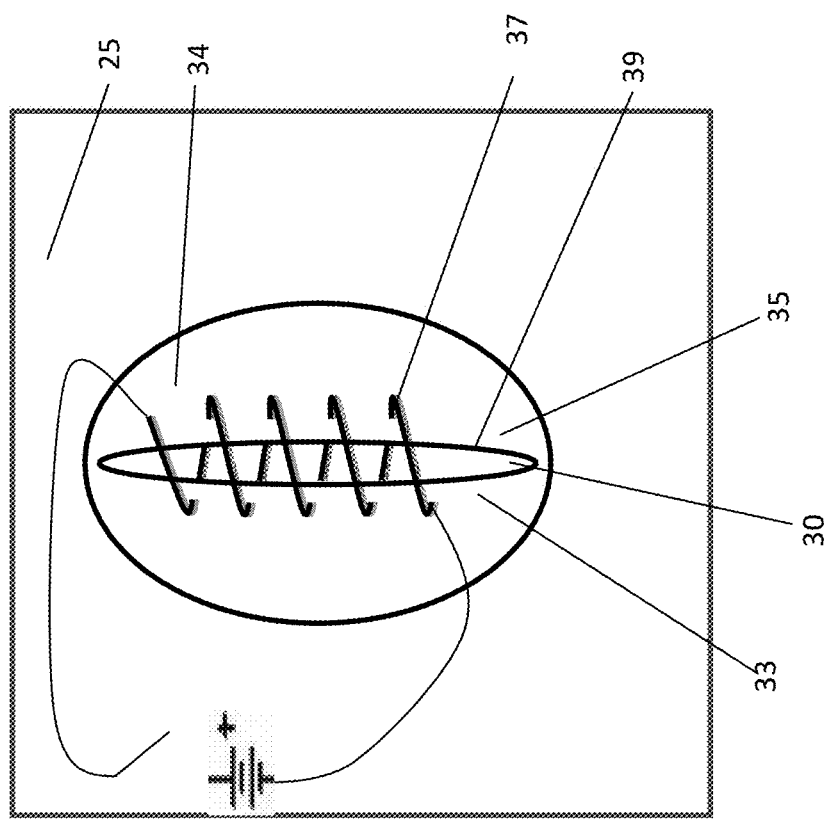

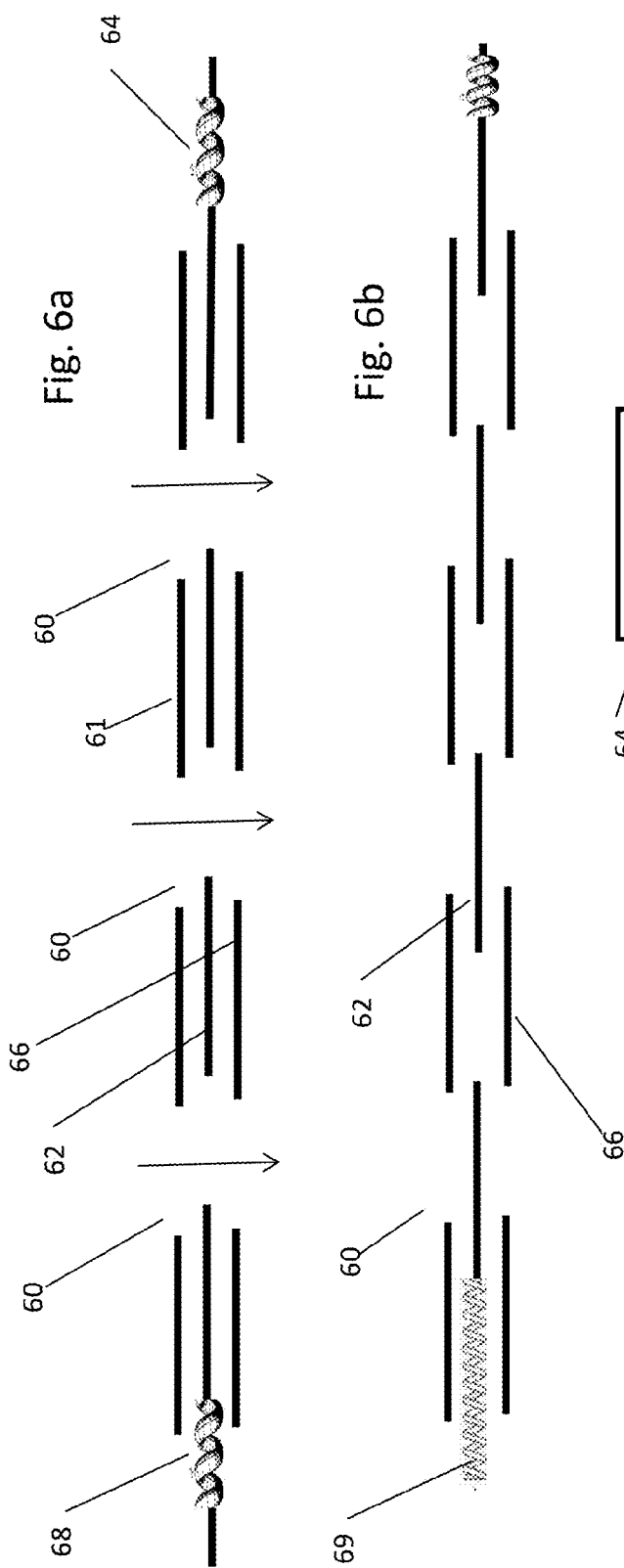
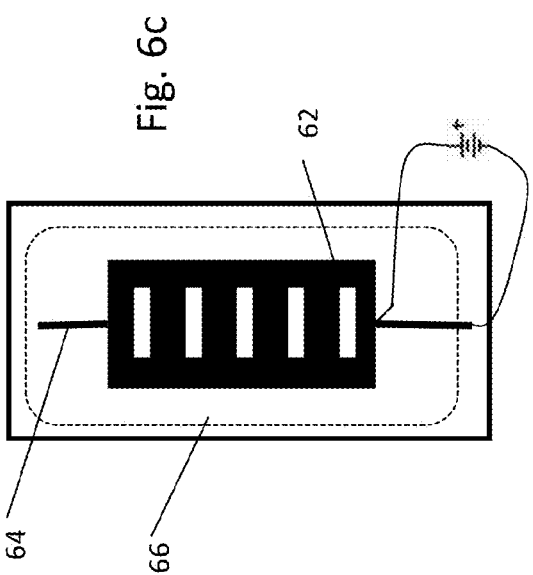

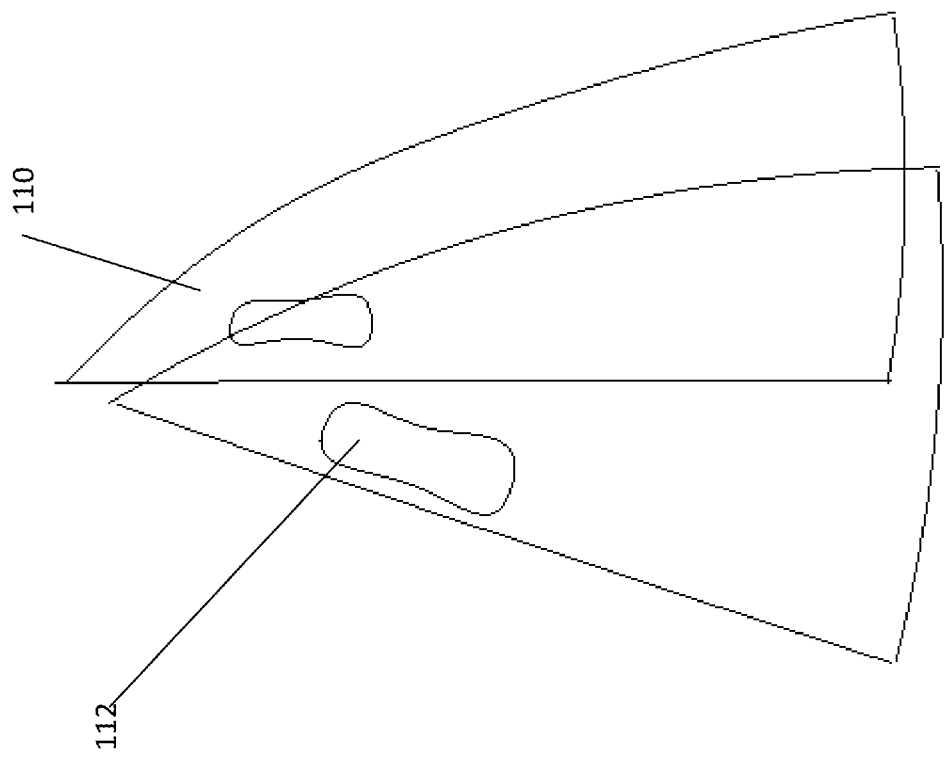

VALVE FOR CONTROLLING FABRIC PERMEABILITY, CONTROLLABLE PERMEABILITY FABRIC, AND ARTICLES USING SAME

STATEMENT OF GOVERNMENT INTEREST

This invention was made with Government support under contract number W911QY-11-P-0135 awarded by U.S Army NATICK Contracting Division. The Government has certain rights in the invention.

FIELD OF THE INVENTION

This invention relates generally to articles made from or incorporating fabrics, and more particularly to such fabric based articles having controllable fluid permeability.

BACKGROUND OF THE INVENTION

The permeability of most fabrics and fabric based articles to fluid passage is set during manufacturing. Parameters such as the materials from which the fabric is made, the weave density and pattern, and the general structure such as holes formed in the fabric, control its permeability. However certain articles may benefit from the ability to dynamically control such permeability. By way of example, parachutes, sails, filters, and aircrafts may all benefit from the ability to control the rate at which fluid passes therethrough.

Attempts at providing variable permeability in fabrics have been made for various purposes. By way of example, U.S. Pat. No. 3,222,016 discloses a variable permeability fabric for a parachute. U.S. Pat. No. 5,115,582 discloses a spiral fabric papermaker belt having adjustable permeability. U.S. Pat. No. 7,820,571 discloses a fabric exhibiting reversibly changeable air permeability responsive to humidity. In US 2008/0254263, Yausi et al. disclose a composite fabric material exhibiting three dimensional structural change upon water absorption.

In these specifications the terms variable permeability and controlled permeability, and the varied inflictions of those terms, are also used interchangeably. A fabric based article should be construed to mean an article which is primarily made of fabric, regardless if other materials are incorporated in the article or if the fabric article is incorporated within another article, and modifies the permeability of the article in which it is incorporated.

Methods of controlling fabric permeability are generally broadly divided between two main categories, referred to herein as geometric permeability, and weave permeability. Controlled weave permeability is determined by the weave of the fabric, and its finish. Weave permeability modifies either the pore size between adjacent strands, or changes the shape or geometry of the weave of the fabric itself. In contrast, variable geometric permeability involves changing the geometry of a fabric based article as a whole. Therefore changes to the general shape, or more commonly, opening or by closing of holes, slots and other voids of various shapes within the fabric article, change the permeability of the article as a whole. In geometric permeability the openings are generally significantly larger than the distance between adjacent strands of the fabric. Thus, while variable geometric permeability relates to the permeability of the fabric based article, variable weave permeability relates to changes in the permeability of the fabric itself, regardless of the article in which it is used.

Changes in geometrical permeability may effect the weave permeability, and vice versa. Modifying the permeability of the fabric itself effects the permeability of the fabric based article as a whole, but the weave based variable permeability deals firstly with the permeability of the fabric. Similarly, in many instances, deforming the fabric to open or close a void may also cause change in the fabric weave. However the effects of those weave changes are minor relative to the change in permeability caused by opening or closing of voids, or otherwise changing the geometry of the fabric. Clearly, these specifications and the claims should be construed to extend to combinations of such variable permeability types.

Shape Memory Alloys (commonly known as SMA) are well known in the art. SMA are materials that tend to have a phase change which is induced by environmental factors to which the material is exposed, such as temperature, electromagnetic fields, electric currents, and the like. An object made of SMA material is initially formed into a 'parent shape' by machining, heat treatment and other metalwork techniques. The object may then be manipulated, deformed, bent, stretched and the like, and would generally maintain the shape to which it is manipulated. However, once exposed to specific known conditions, the material goes through the phase change, and resumes the 'parent shape', in a process known as 'shape memory transformation'. Certain SMAs are capable of 'memorizing' two shapes, one for high temperature and the other for low temperature, or for two states of the known conditions. A common SMA material is known in its commercial name NITINOL (Nickel Titanium Naval ordinance Laboratory), however the invention is not limited to use of any specific material.

Certain medical applications of SMA are directed at forming a medical device such as stents, filters, and the like, which are either made of SMA materials, or are based on its operation. Generally those devices are based on forming a structure comprising SMA material and shaping it into substantially a parent shape. The material is then deformed, and placed in a body cavity such as a blood vessel, intestinal or urinary tract, and the like. Placement occurs by different means, but generally a catheter is a common tool used to insert the device into its position in the body, and the SMA allows a relatively large structure, to be positioned by a much smaller catheter. Examples of such applications are described, by way of example, in US2007/0135834 to Clubb et al., U.S. Pat. No. 7,367,985 to Mazzocchi et al., and in US2008/0228028 to Carlsom et al. Certain devices utilize the body temperature to transition the SMA base object to a desired shape, once inside a desired location in a human body.

U.S. Pat. No. 6,164,339 and U.S. Pat. No. 6,192,994, both to Greenhalgh, disclose a method of manufacturing a woven textile having a structural member integrally woven therein. The structural member comprises a wire which is trained to undergo a shape memory transformation. The straight wire is inserted into the fabric during manufacturing, and is transformed back to an undulating shape thereafter. Greenlhlag is directed to creating a combined stent/graft structure for repair of a body tube in a living body. It is noted that the above examples are designed for forming a device, and shaping it to a temporary shape utilizing various combinations of temperature, pressure, and the like, and then allowing it to get back to its original shape once deployed. That action is expected to take place only once in the useful life of the device. The above devices do not take advantage of the SMA ability to repeatedly move from one state to another responsive to repeated heating and cooling thereof.

In US 2004/0183283, Buckman et al. disclose a personal air bag inflation device which optionally utilizes garments fabricated from fibers that are highly flexible in their unactivated state, such as Nitinol. Following activation, these fibers become more rigid and provide additional impact, penetration, and skid protection. The nitinol shape-memory elements may be comprised of nanofabricated or micromachined into the cloth of the garment. Activation of the microscopic nitinol shape-memory elements by applying electricity to the elements, causes them to change shape to stiffen the fabric or cloth of the garment.

SMA actuators are known, whereby electrical current is passed in a wire made of SMA material. The resulting temperature change causes the wire to contract or expand proportionally to the amount of current. Such wires act as fast, light weight, and relatively high powered actuators. In most cases, the actuators may be continuously adjusted between a 'relaxed' state and a 'fully activated' state Control of fabric permeability while fabric based articles are being used, provides special advantages that are oftentimes specific to the application at hand. Thus, by way of example changing the air permeability of a fabric used in a parachute offers better control of the opening speed and shock, the decent rate, and landing speed of the parachute, as well as controlling oscillations, possibly changing direction of the descent, and the like. Providing a boat sail with controlled air permeability allows optimizing the sail shape to current conditions such as wind strength and direction, allowing spilling of air from the sail at desired areas, may act as a substitute to reefing the sail, and the like. Filters made by utilizing variable permeability offer the ability of changing the particle size which they filter, and optionally offer a cleaning method of the filter by changing the pore size at selected times.

There is therefore a clear and heretofore unanswered need for materials and methods to dynamically change the fluid permeability of a fabric in a controlled manner, as well as for articles utilizing such materials and methods.

SUMMARY OF THE INVENTION

The objects of various aspects of the present invention are to resolve the shortcomings of the known art.

In its most general form, the invention provides for varying the fabric fluid permeability by controlling at least one SMA based actuator. The SMA actuator may operate by changing the geometric permeability or by modifying the weave permeability of the fabric based article, or a portion or portions thereof. The actuator is preferably controlled by electric currents passing therethrough, but may also be controlled by modifying the temperature, or providing electromagnetic fields, to which the SMA actuator is exposed.

It is often desired that only portions of the fabric based article have the capacity to change permeability. An area with variable permeability within a larger article shall be referred to as a 'valve' hereinunder. A valve may be formed utilizing either geometric variable permeability or weave variable permeability, and a single article may comprise one or more valves, in any combination of types. Valves may be formed by SMA actuators anchored directly or indirectly to the fabric, the SMA may engulf a portion of the fabric, or may be incorporated into the weave of the fabric. Some valves comprise voids in the fabric which are changed by applying forces to the fabric, or by moving blocking structure across voids, to selectively modify the fluid flow through such voids.

The actuator comprises a coiled SMA wire or wires. The coiled SMA actuator forms an important aspect in many embodiments of the present invention, as it offers large gains in the dynamic range of the SMA actuator as compared to a straight SMA wire. Further preferably, the actuator is coated by protective material such as silicon rubber, and the like.

Optionally temperature protection may be provided to the SMA and surrounding structure. Such control may be achieved by controlling the current through the actuator, such as by controlling the voltage or the duty cycle. Optionally mechanical interrupters such as fuses, circuit breakers, resettable thermostats, switches, and the like, are provided to limit the temperature by interrupting the current through the SMA actuator. In certain embodiments, the expansion or contraction of the SMA itself may be used to control the temperature.

Various aspects of the present invention provide for numerous methods of geometrical based and/or weave based permeability control, and for combinations thereof.

In certain embodiments the SMA actuators operate directly on the fabric, and in others the actuators operate by controlling voids via intermediate materials that adhere to the fabric or otherwise are attached thereto. By way of non limiting example intermediate material may be a silicon rubber, latex, or other rubbery substance adhered to the fabric, pins, sections of fabric which act as a shutter, an activating string, a spring, and the like.

Other aspects of the invention include different uses enabled by various controlled fluid permeability fabric. By way of example such uses include incorporating the controlled permeability fabric in parachutes, sails, and filters, as described below.

SHORT DESCRIPTION OF DRAWINGS

The summary above, and the following detailed description will be better understood in view of the enclosed drawings which depict details of preferred embodiments. It should however be noted that the invention is not limited to the precise arrangement shown in the drawings and that the drawings are provided merely as examples.

FIG. 1a depicts an SMA actuator formed into a coil. FIG. 1b depicts further details of the actuator. FIG. 1c depicts the SMA coil encapsulated within a flexible material.

FIG. 2a, b and c depict SMA actuator woven into a fabric.

FIGS. 3a and 3b depict a sewn slot valve.

FIGS. 6a-6c depict a fabric shutter type valve.

FIG. 11 depicts a sail embodying yet another aspect of the invention.

DETAILED DESCRIPTION OF EXAMPLE EMBODIMENTS

Figure 4C:
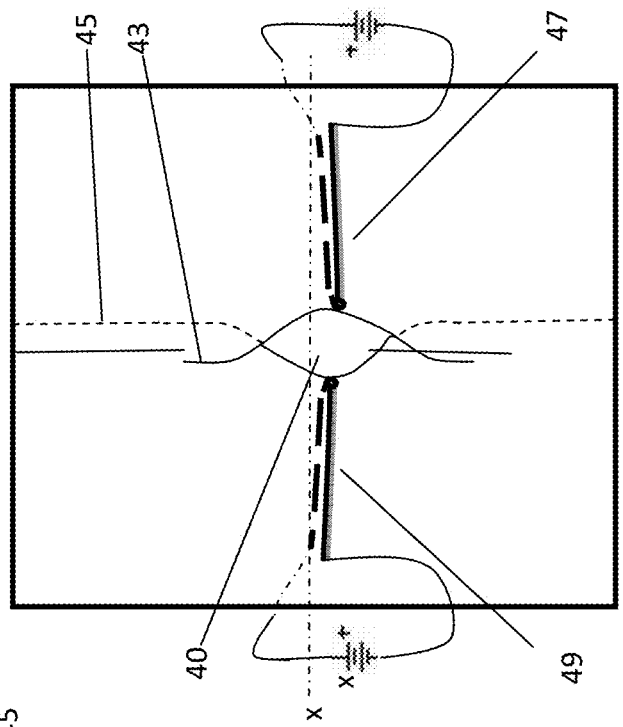
FIGS. 4a-4d depict a single slot fabric overlap valve.

In its simplest embodiment, the present invention utilizes a SMA actuator to modify the fluid permeability of a fabric based article. Preferably, the SMA actuator takes the form of a wire, or a coil as shown in FIG. 1, but in certain embodiments (not shown) the actuator may take other shapes, such as a rod, a disc, a spiral, and the like, by way of non-limiting example.

FIG. 1a depicts an example of SMA based actuator 10. For illustration purposes, this figure shows several embodiments of the actuator combined, to demonstrate the differences therebetween. Portion 12 depicts an actuator formed of a straight SMA wire 101. Portion 14 depicts an actuator comprising SMA wire formed into a coil 105.

It was found that forming the SMA into a coil provides unforeseen and unobvious advantages, by providing longer actuator strokes. In some embodiments the ratio of expansion and or contraction of a coiled SMA wire is tenfold or higher than the that of a straight wire SMA, according to the selected materials and the coil geometry. The coil based actuator may further provide changes in other dimensions due to it geometry.

Portion 16 depicts a coiled SMA wire 110 coated with heat shielding material 115 such as silicon or siliconized rubber, polymers such as polyurethane, latex, and the like. The heat shield coating is provided to protect the fabric from excessive temperature caused by the heating of the SMA. In certain embodiments it is also desired to insulate the wire from the environment, to prevent short circuiting the actuator, or otherwise transferring charge to the ambient environment. Insulation may be combined with the heat shield (as is done by way of example by using siliconized rubber), or provided separately. FIG. 1b depicts a closer view of the encapsulation of the SMA coiled wire within such heat shield and/or insulating material.

FIG. 1.c depicts an optional manner of providing heat shielding and/or insulating to the SMA wire, wherein the coiled SMA wire is disposed within a protective sleeve 120. In one option, the sleeve provides both the insulation and the heat shield, and in another option the sleeve provides only one of those functions. Optionally, a coated coiled SMA wire may be disposed within the protective sleeve, where the coating provides additional protection (not shown).

The protecting sleeve 16 provides further advantages, where it prevents the coiled SMA from tangling or interfering with itself or other items in its environment. Furthermore, a rigid or substantially rigid sleeve imparts greater linearity to the actuator. If utilized as a yarn within a fabric, the sleeved SMA coil may more readily be weaved like other yarns, and will protect the SMA from tangling with the rest of the fabric as it is activated.

Preferably, the actuator is activated by passing electric current therethrough, which causes the actuator to heat due to the electrical resistance thereof. It is noted that alternative methods of causing actuation are also considered, such as exposing the actuator to electromagnetic or magnetic fields, supplying heat energy from sources other than the heat caused by passing current through the wire, and the like.

FIGS. 2a, 2b, and 2c represent examples of weave variable permeability valve. SMA actuators 25 are weaved into the fabric 21. FIG. 2a. depicts one embodiment where the SMA is weaved into plain weave type weave. FIGS. 2b and 2c depict a variable permeability fabric utilizing the sateen weave. As seen in FIG. 2c, the activation of the actuator causes changes 28 in the pore size of the fabric, with the ensuing change in permeability. The skilled in the art will recognize that similar changes in pore size occur in other weave types. Other embodiments would be clear to the skilled in the art in light of the teachings provided herein. As noted above, the whole fabric based article may be constructed of fabric with variable permeability, or valves made of variable permeability fabric may be incorporated in one or more areas of a larger article.

FIGS. 3a and 3b, depict one example of geometrical permeability valve. The fabric 25 has a slot 30 formed therein. The two sides 33 and 35 of the slot 30 are sewn together utilizing a SMA actuator 37, preferably of a coiled construction as depicted in FIG. 1b and/or FIG. 1c. The sewing is made such that when the SMA is relaxed, it is relatively loose and allows the slot to open. Thus, when the actuator is relaxed as shown in FIG. 3a, the slot allows large amount of fluid to pass therethrough. When the actuator is active as shown in FIG. 3b, the slot dimensions are reduced, and the amount of fluid flowing there through is reduced. Optionally an intermediate material, such as silicon rubber or other rubbery material, may be coupled to the fabric, and the actuator would act on the intermediate material. Such construction provides additional temperature protection to the fabric, and may also be formed to create resilience in one or more direction.

FIG. 3 belongs to a type of valve termed 'normally-open'. Normally-open valves allow higher rates of fluid flow when the actuator is relaxed, and reduce fluid flow rate when the actuator is activated. In contrast, in a 'normally-closed' type valves, the vale allows lower fluid flow rate when the actuator is relaxed, and higher fluid flow rate when the actuator is activated.

Figure 4D:
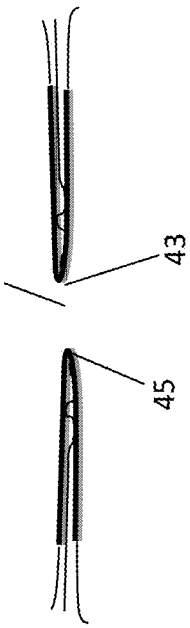
Figure 4A:
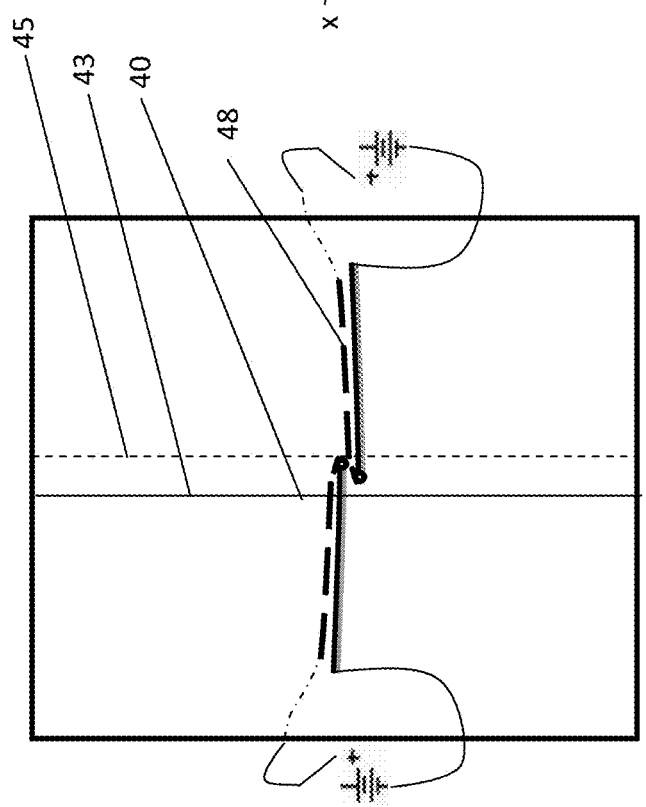
Figure 4B:

FIGS. 4a, 4b, 4c, and 4d depict a portion of a fabric article acting as a normally-closed valve. FIG. 4a is an elevation view and FIG. 4b is a side view of the valve with the actuators in the relaxed state, while FIG. 4c and FIG. 4d are elevation and side views of the valve in an activated state. FIGS. 4b and 4d represent a side view taken along axis line x-x.

In the relaxed state, slot 40 is covered by lips 43 and 45. One end of each of actuators 47 and 49 is anchored to the fabric article 48, and the other end to lips 43 and 45 respectively. In the relaxed state, lips 43 and 45 are close to each other, and preferably overlap, to limit fluid flow through slot 40, as seen in FIGS. 4a and 4b. As seen in FIGS. 4c and 4d, when both actuators are activated, the slot opens, and fluid flow increases. Partial activation, and/or activation of one or both actuators, offers various rates of permeability.

It is important to note that in embodiments which use two or more separate actuators, the actuators may be operated simultaneously or separately, to obtain more precise control of the fluid flow. Furthermore, it is noted that in most embodiments, proportional control of one or more valves may be obtained by controlling the amount of current flowing through the actuator.

Figure 5B:
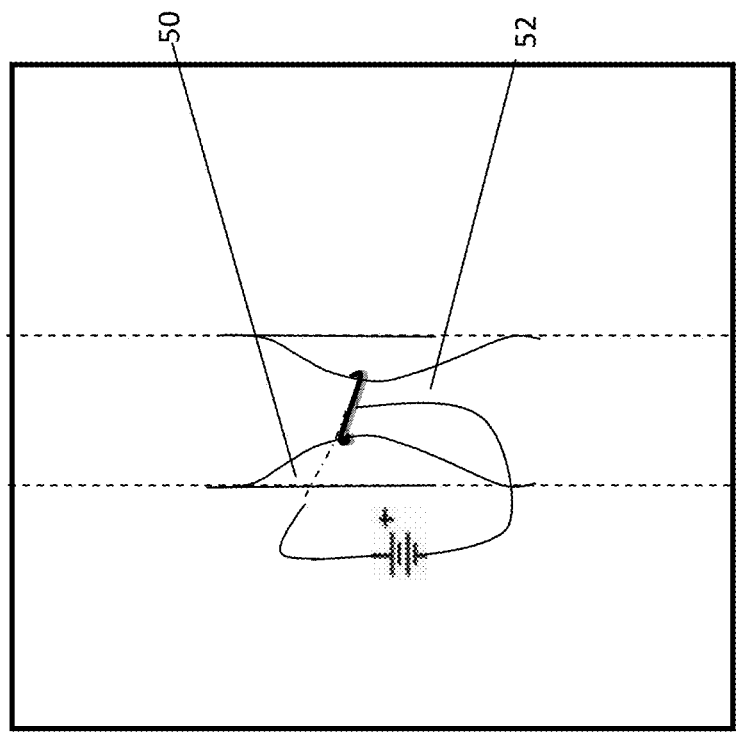
FIGS. 5a-5d depict a double slot fabric overlap valve.
Figure 5D:
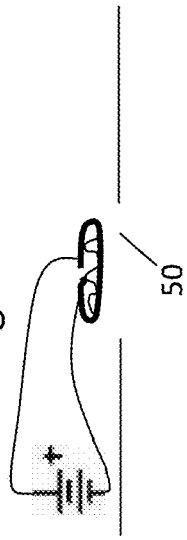
Figure 5A:
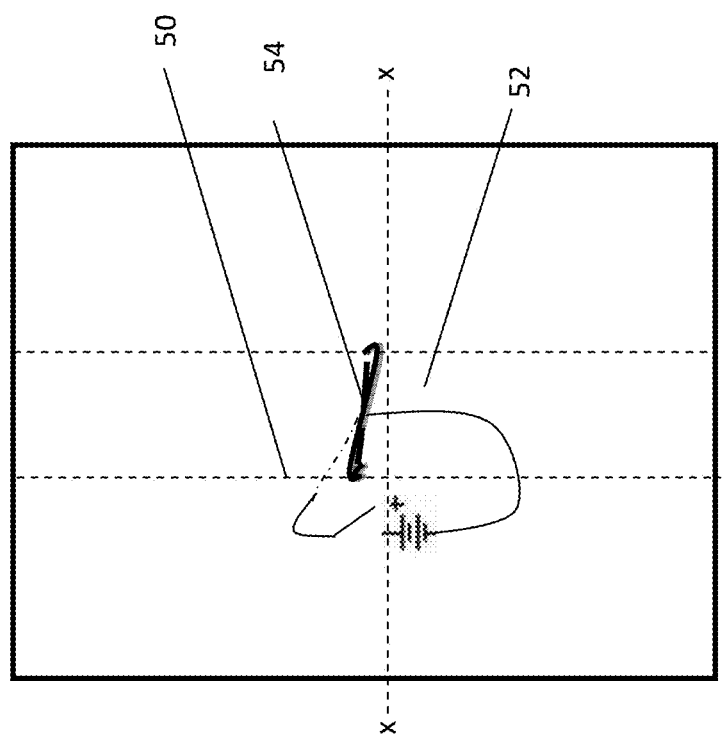
Figure 5C:
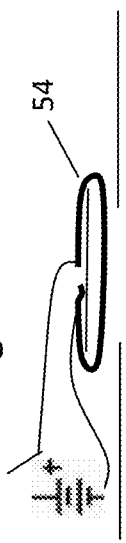

Similarly to FIGS. 4a, b, c, and d, FIGS. 5a, b, c, and d, represent respective views of yet another 'normally-closed' valve embodiment. In this embodiment slot 50 is covered by gate 52. Actuator 54 is either embedded within, or otherwise coupled to gate 52, so as to twist, reduce width, or otherwise remove portions of the gate from registration or overlapping of slot 50, as seen in FIGS. 5c and 5d. Removing the gate 52 from the slot 50, in whole or in parts, increases fluid flow through the valve.

Certain embodiments may be designed so as to offer an easy selection of the valve type between normally-open or normally-closed types. FIGS. 6a and 6b are cutoff side view, and FIG. 6c is an elevation view of one exemplary embodiment of this type. In this embodiment fluid flow rate is controlled by selectively covering and uncovering all or a portion of a number of slots disposed within the fabric 61. In the shown embodiment, a plurality of holes 60 is formed in fabric. A SMA actuator 64 moves a gate 62 with matching holes across the fabric to selectively cover or uncover the holes therein. The holes in the gate and in the fabric may be of any desired shape or size, and the holes in the fabric and in the gate may be of different numbers, sizes, and shapes, as long as the desired functionality of the gate to adjust or stop the fluid flow through the fabric holes responsive to actuator activation is achieved. While the gate may be created from any material, in preferred embodiments it is made of fabric or a thin and generally flexible material. A cover layer 66 is provided to hold the gate 62 and forms a guide pocket or rail to guide the gate along the desired path across the holes in the fabric. FIG. 6b depicts the valve in its closed state, as the gate covers the fabric holes, while FIG. 6a depicts the valve in its open state, as the gate holes and the fabric holes are in substantial registration. In certain embodiments the gate is urged back into a relaxed state, and the relative location of the fabric and gate holes define the type of such valve as normally open or normally closed. Optionally, a second actuator 68 is provided to move the gate in a direction opposite to the direction in which actuator 64 moves it. Thus the gate may be selectively situated in at least two states, but preferably also in any desired flow rate between the closed and open states, by energizing the appropriate actuator to desired level. While FIG. 6a shows the optional second actuator 68, FIG. 6b depicts yet another embodiment, where a spring 69 is utilized to urge the gate 62 against actuator 64. It is noted that in some embodiments, fluid pressure may be utilized to urge the gate to a relaxed state (not shown)

Figure 7A:
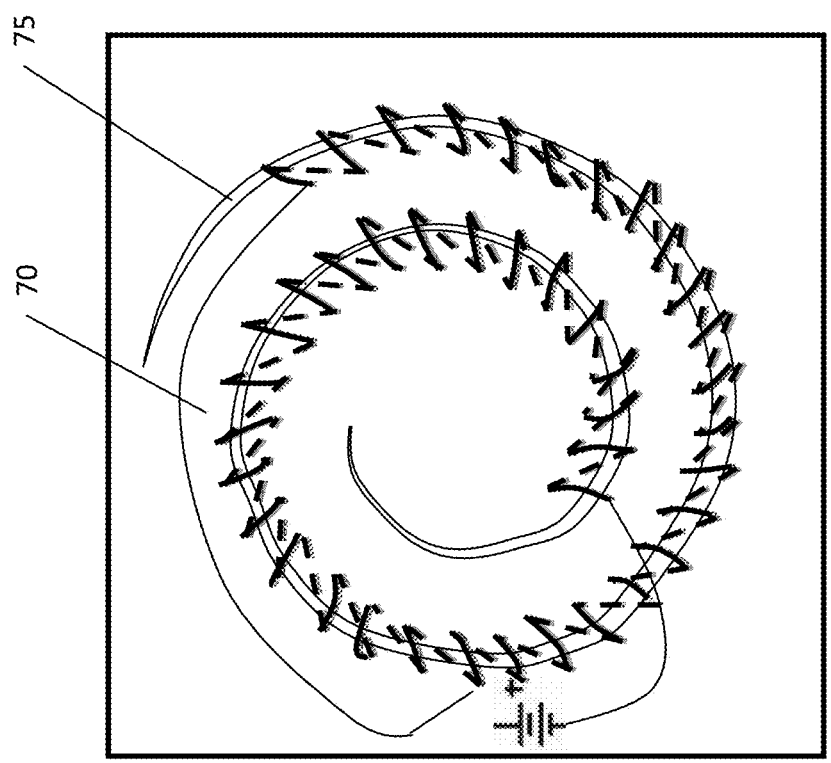
FIGS. 7a-7b depict a spiral valve.
Figure 7B:
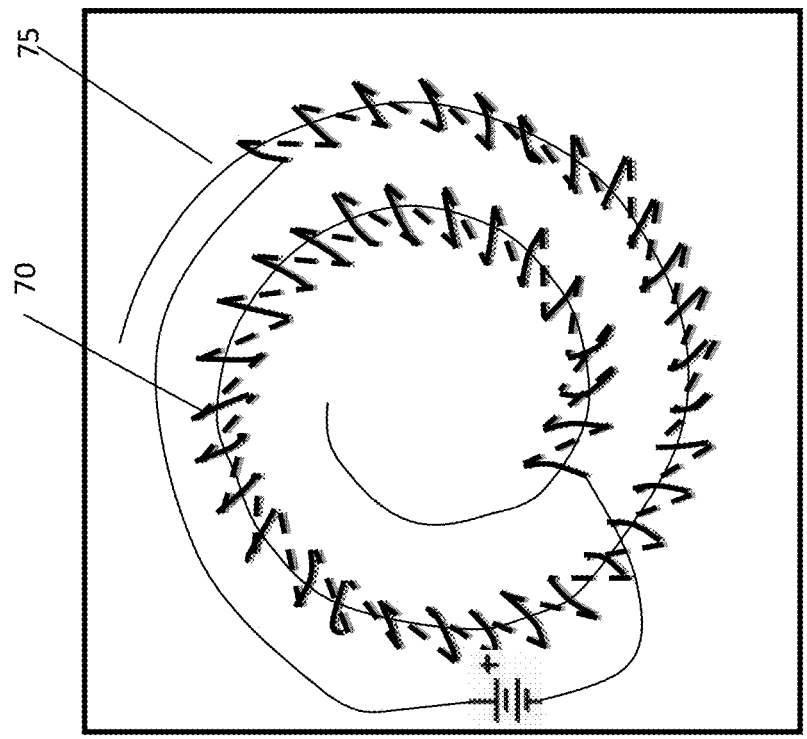

FIGS. 7a and 7b depict yet another embodiment of a 'normally-open' valve. The method of operation is substantially similar to the slot of FIG. 3, but the slot is replaced by a spiral 75, and the opening or closing thereof is controlled by actuator 70. FIG. 7a depicts the relaxed valve, while FIG. 7b depicts the activated valve.

Figure 8B:
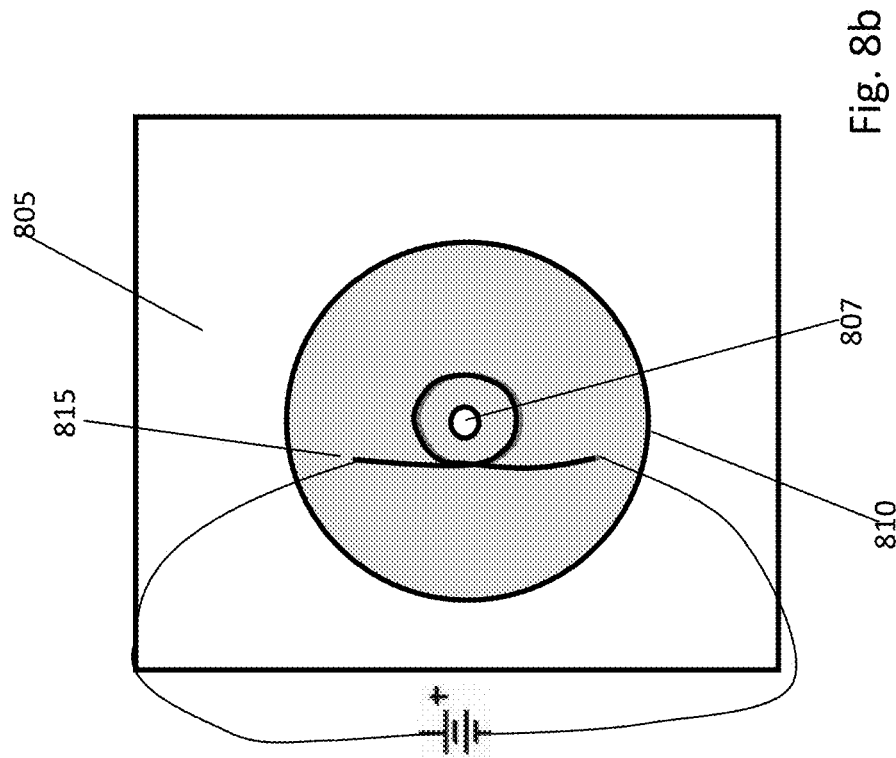
FIGS. 8a-8b depict a flexible hole valve.
Figure 8A:
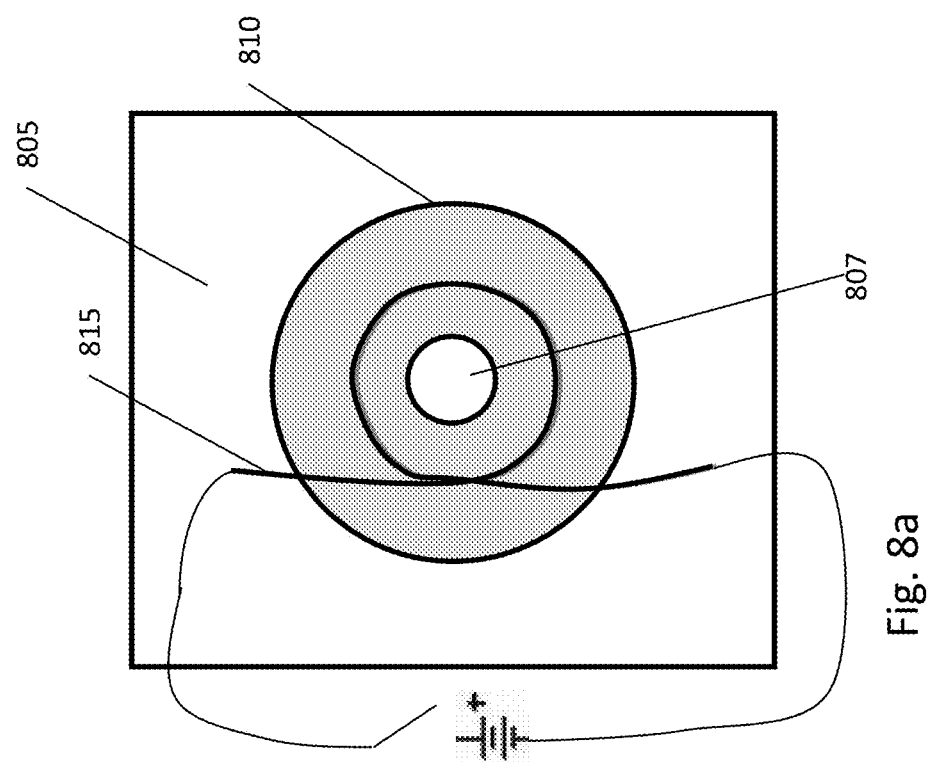

FIGS. 8a and 8b depicts a valve based on a circular hole 807 that is being closed when the SMA actuator 815 is energized. It is noted that for such embodiments where the SMA crosses upon itself, insulation is placed between the crossed wires, so as to prevent short circuit. Such insulation may be created by the coated coil as shown on FIG. 1, or the SMA coil or wire may be embedded within rubbery material that is attached to the fabric, where the rubbery material is utilized to prevent short-circuiting the SMA.

Figure 9B:
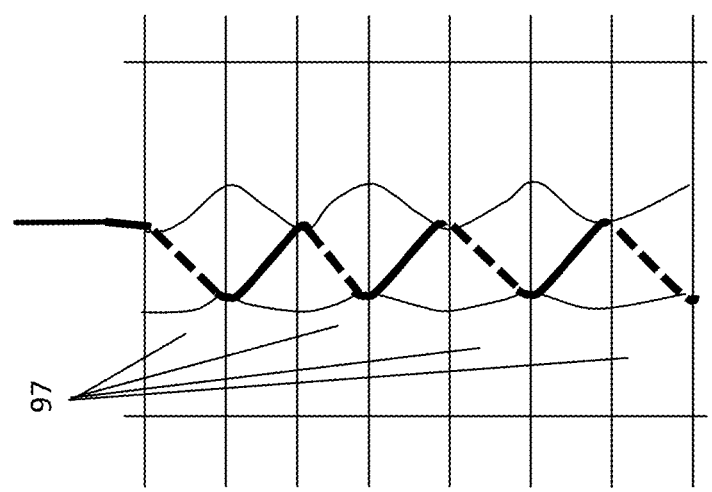
FIGS. 9a-9b depict the weave with a SMA woven around the fabric cloth.
Figure 9A:
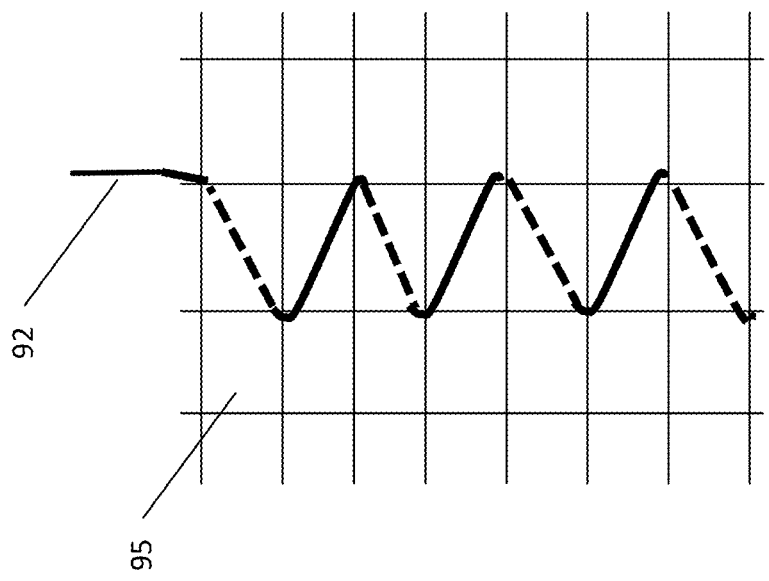

FIGS. 9a and 9b. Depict an embodiment of a weave pattern 95 that is moved open and closed with a SMA coil actuator 92. FIG. 9a depicts the weave with the SMA woven around the fabric cloth. FIG. 9b depicts the weave pattern being separated by the energized SMA coil. It is seen that the permeability is increased as the actuator 92 is energized, since the pore size 97 is increased. The SMA actuator depicted in FIG. 1a is especially beneficial for such weave based valves, as it may be woven directly and easily into this and other weave based designs.

In light of the example embodiments for various types of valves provided above, the skilled in the art would recognize different variations may be employed for constructing such valves. Embodiments that include plurality of holes and/or slots, placing the SMA in other yarn, either as a part of the weave or embedding the SMA in the yarn to modify the base fabric weave upon the activation of the SMA. Further embodiments may utilize different geometrical solutions, utilization of different gates, made from fabric or other materials such as plastic, paper, cardboard or even light metals.

Figure 10A:
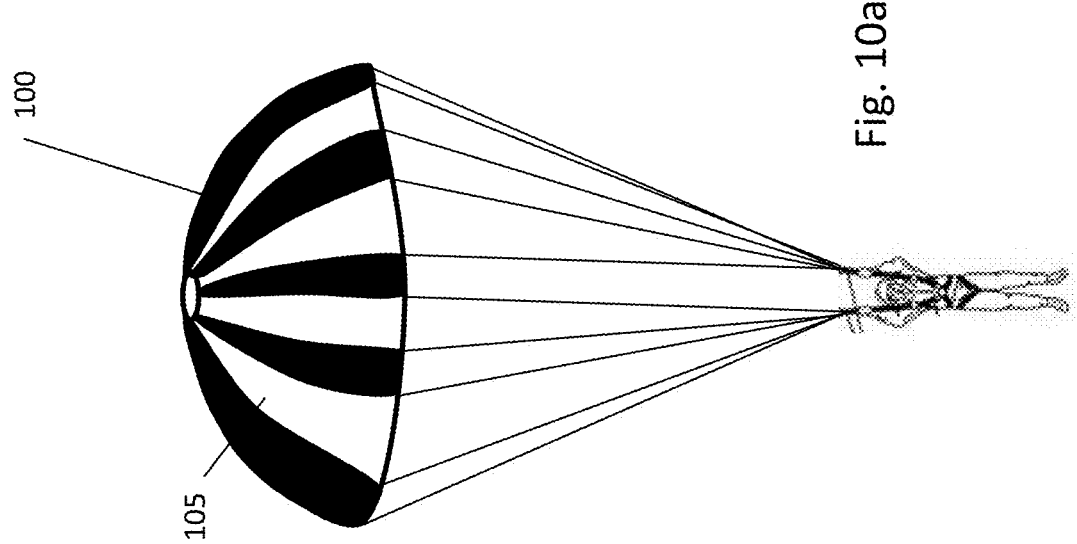
FIG. 10a depicts a parachute embodying certain aspects of the present invention.
Figure 10B:
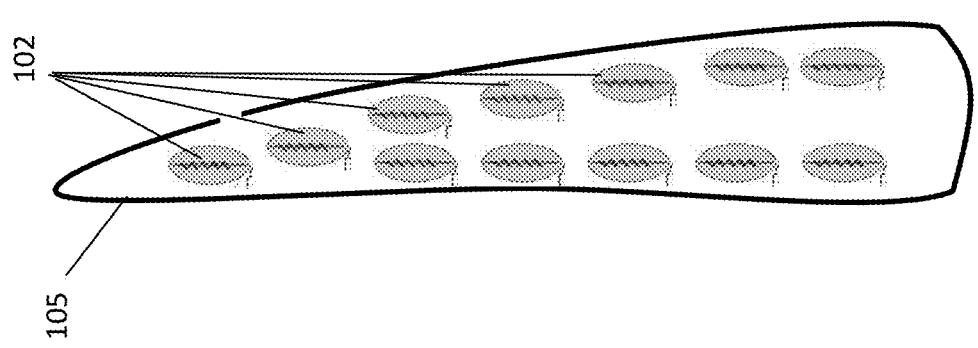
FIG. 10b depicts a gore section of such parachute.

Another aspect of the present invention involves dynamically changing the porosity of a parachute. The term parachute should be construed to extend to fabric based air brake, paraglider, parawing, drogue chute, ram air parachute, and the like. FIG. 10a depicts a parachute 100 having at least one SMA actuator based valve, but preferably a plurality of valves 102 embedded in several locations within the canopy. The valves may be located in one or more gores in the case of a round parachute as shown in FIG. 10b, and different combinations of valve types may be utilized. The skilled in the art would readily recognize that valves may similarly be incorporated in cruciform parachutes, ram airfoil parachutes, drogues, and the like. The valves may be used for adjusting the opening shock, controlling the rate of descent, oscillation prevention, and/or directional control. The power source for controlling the SMA actuators may be carried by the parachutists or the cargo being parachuted, however in an optional embodiment the power source for individual valves may be attached thereto. A controller (not shown) measuring acceleration, altitude above the terrain, and the like, may be utilized to automatically adjust the porosity of the parachute according to the desired conditions at any point during the parachute drop.

FIG. 11 depicts yet another aspect of the invention, as used in a sail. The sail 110 has at least one valve 112 embedded therein, but preferably a plurality of valves are embedded in several places thus allowing spillage of air at places which most preserve its shape and are designed to optimize the lift provided thereby. Additionally, a valve or a plurality of valves may be incorporated to achieve effective reefing of the sail, or fast and orderly manner of dropping the sail. Common techniques for sail design and simulation are best deployed for deciding the best places to locate such valves, and such will be specific to the sail design in question.

Figure 12:
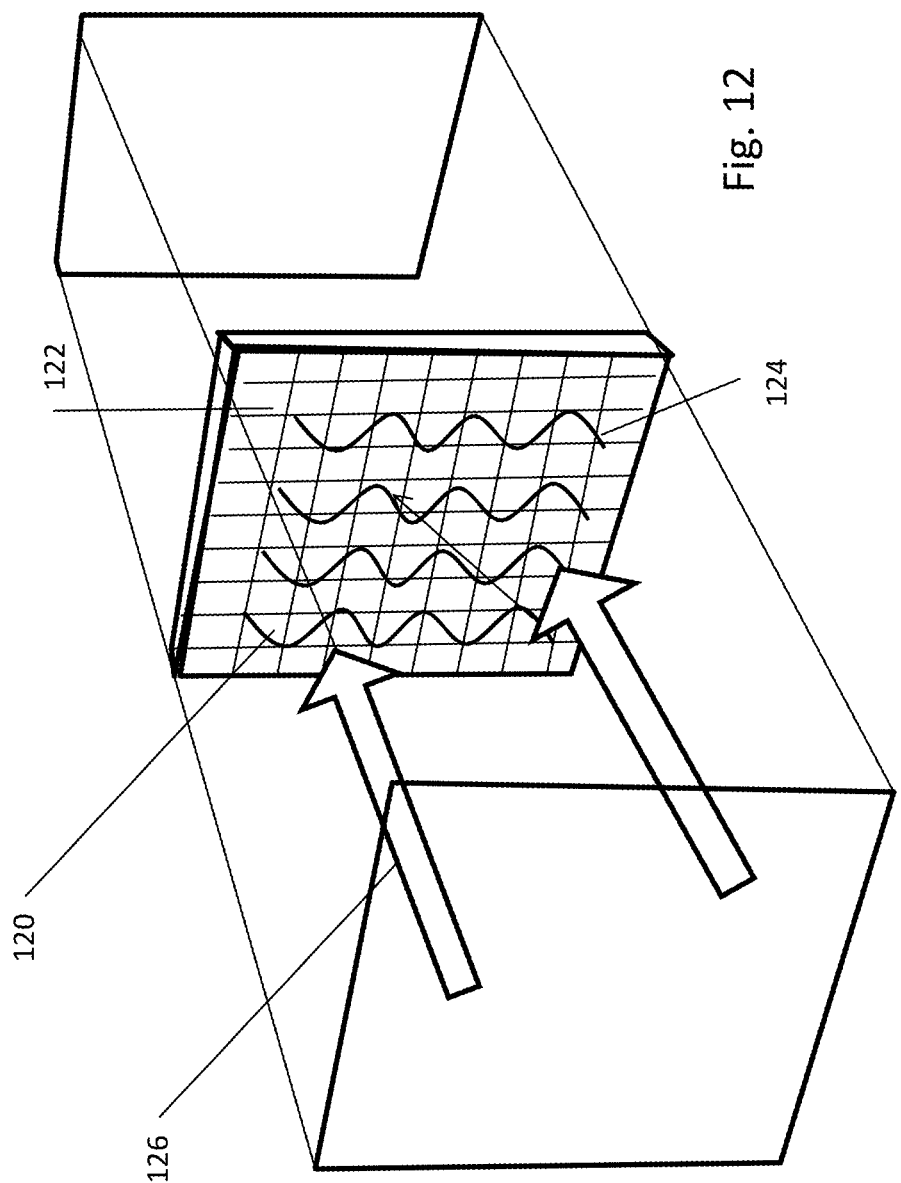
FIG. 12 depicts a filter using element embodying yet another aspect of the invention.

FIG. 12 depicts a filter 120 disposed in a filter body 121, and using element 110 utilizing SMA activated porosity modifiers. For controlling pore size, and therefore the size of filtered particles, weave based variable permeability valve 122 is preferred. However permeability modifiers 124 may be utilized for temporarily allowing larger particles to pass through, as well as provide for cleaning or bypassing the valve. The use of a barrier that can be opened or closed enables the breaking up of cakes that form on the filters as well.

It is important to note that the term permeability relates to any fluid, and is not limited to any specific gas or liquid.

The term SMA incorporates herein, as an acronym, the term alloy. However it is noted that certain shape memory materials are not necessary metals. Shape memory polymers are also known, and the term SMA should be construed to extend to all such materials which exhibit shape memory.

In these specifications the term 'relaxed' when relating to the state of the SMA actuator relates to un-energized actuator, while 'active' relates to an actuator which receives sufficient energy to cause change in the permeability of the fabric, or the fabric article. The term 'Stroke' as it relates to an actuator, depicts the total change in at least one dimension of the actuator, which is commonly the longitudinal dimension. However expansion and contraction in other dimensions are also considered, either in a single dimension or in combinations thereof. By way of example, an actuator lengthwise change may be accompanied by thickness change as well. It is further noted that an actuator may be formed to either expand or contract The term coil is not limited to a round coil, but extends to other geometrical shapes, such as square, triangular, or any other geometrical shape. The term coil should also extend to a substantially flat two dimensional arrangement of a coil of any desired shape, such as to a round, elliptical, serpentine, zigzag, square, and the like.

It is further noted that the voids in the fabric such as slots, holes, slits, and the like, may be partially obstructed, and in fact are oftentimes partially obstructed, even in their open state, by the SMA material or by other structure which forms the valves, and similarly, that the valves described herein do not necessarily shut all fluid flow, but rather reduce or increase fluid flow thorough their effective area in response to the control that is applied to the actuator.

Certain portions of the valves described herein comprise fabric, as well as other materials which may be attached to the fabric, such as coatings, anchors, and the like. Similarly gates may comprise fabric and/or other materials such as plastic, metal, and the like.

The SMA actuators may be incorporated into any type of fabric, including by way of example fabrics made from nylon, p-aramid, polyester, etc. The fabrics can be woven, non-woven, or a combination of materials.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

We claim:

1. A permeability valve for controlling the fluid permeability of a fabric, the valve comprising:
    A fabric;
    a gate guide coupled to the fabric and disposed about at least one void within the fabric;
    a fabric gate disposed to be movably guided by the gate guide;
    an actuator coupled to the gate, to controllably impart motion to the gate within the gate guide, for selectively covering the at least one fabric void, or a portion thereof.

2. A valve as claimed in claim 1, wherein the actuator is electrically operated.

3. A valve as claimed in claim 2, wherein the guide comprises a plurality of gate voids, and the fabric comprising a plurality of fabric voids, and wherein the gate is movable by the actuator to modify overlap level between the fabric voids and the gate voids.

4. A valve as claimed in claim 3, wherein the fabric voids, or the gate voids, or the fabric voids and the gate voids, are formed as slots.

5. A valve as claimed in claim 2, further comprising a counter-actuator coupled to the gate, to urge the gate in a direction opposite to the direction affected by the actuator.

6. A valve as claimed in claim 5, wherein the counter-actuator comprises elastic member.

7. A valve as claimed in claim 5, wherein the counter-actuator comprises a Shape Memory Alloy (SMA) wire.

8. A valve as claimed in claim 2, wherein the actuator comprises a Shape Memory Alloy (SMA) wire.

9. A valve as claimed in claim 7, wherein the wire is formed as a coil.

10. A valve as claimed in claim 7, wherein the actuator is coated by protective material.

11. A valve as claimed in claim 10, wherein the coating material comprises silicon rubber.

12. A valve as claimed in claim 2, wherein the gate guide comprises fabric.

13. A valve as claimed in claim 2, further comprising a protective sleeve disposed about the actuator.

14. A valve as claimed in claim 1, wherein the gate guide comprises fabric.

15. A valve as claimed in claim 1, further comprising a protective sleeve disposed about the actuator.

16. A valve as claimed in claim 1, wherein the actuator movement is linear.

17. A valve as claimed in claim 1, wherein the guide comprises resilient material coupled to the fabric.

18. A valve as claimed in claim 1, wherein the actuator is embedded in the fabric.

19. A waterborne craft sail comprising fabric having a plurality of valves as claimed in claim 1.

20. A parachute comprising a plurality of valves as claimed in claim 1.

21. A filter element comprising a plurality of valves as claimed in claim 1.

* * * * *